United States Patent
Harper et al.

(10) Patent No.: US 10,250,034 B2
(45) Date of Patent: Apr. 2, 2019

(54) DISTRIBUTED UTILITY RESOURCE PLANNING AND FORECAST

(71) Applicant: ABB Schweiz AG, Baden (CH)

(72) Inventors: Karl E. Harper, Cary, NC (US); Elizabeth Kielszewski, Chapel Hill, NC (US); Thomas C. Fox, Jr., Roswell, GA (US); Paul B. Manning, Dunwoody, GA (US)

(73) Assignee: ABB SCHWEIZ AG, Baden (CH)

( * ) Notice: Subject to any disclaimer, the term of this patent is extended or adjusted under 35 U.S.C. 154(b) by 407 days.

(21) Appl. No.: 14/835,791

(22) Filed: Aug. 26, 2015

(65) Prior Publication Data

US 2017/0063084 A1    Mar. 2, 2017

(51) Int. Cl.
| | | |
|---|---|---|
| *H02J 3/00* | (2006.01) | |
| *G05B 13/02* | (2006.01) | |
| *G01W 1/00* | (2006.01) | |
| *H02J 13/00* | (2006.01) | |

(52) U.S. Cl.
CPC ............... *H02J 3/00* (2013.01); *G01W 1/00* (2013.01); *G05B 13/026* (2013.01); *H02J 13/0079* (2013.01); *H02J 2003/003* (2013.01); *Y04S 10/54* (2013.01)

(58) Field of Classification Search
CPC .... H02J 3/00; H02J 2003/003; H02J 13/0079; G05B 13/026; G01W 1/00; Y04S 10/54
See application file for complete search history.

(56) References Cited

U.S. PATENT DOCUMENTS

| | | | |
|---|---|---|---|
| 6,178,362 B1 | 1/2001 | Wollard et al. | |
| 6,577,962 B1 | 6/2003 | Afshari | |
| 7,844,517 B2 | 11/2010 | Willen et al. | |
| 7,844,568 B2 | 11/2010 | Fein et al. | |
| 7,873,442 B2 | 1/2011 | Tsui | |
| 8,706,650 B2 | 4/2014 | Ozog | |
| 9,310,785 B2 * | 4/2016 | Otsuki | G05B 13/02 |
| 2004/0215529 A1 * | 10/2004 | Foster | G06Q 30/06 705/26.1 |
| 2009/0048901 A1 | 2/2009 | Richard et al. | |
| 2010/0262312 A1 * | 10/2010 | Kubota | H01M 10/425 700/295 |
| 2011/0063126 A1 | 3/2011 | Kennedy et al. | |

(Continued)

OTHER PUBLICATIONS

James. G., et al. "A Deployed Multi-Agent Framework for Distributed Energy Applications".

(Continued)

*Primary Examiner* — Thomas C Lee
*Assistant Examiner* — Tri T Nguyen
(74) *Attorney, Agent, or Firm* — Taft Stettinius & Hollister LLP; J. Bruce Schelkopf

(57) ABSTRACT

Systems, apparatus, and methods are disclosed for managing and forecasting energy usage. A distributed forecast device is located remote from a central server. The distributed forecast device receives from the central server information related to one or more accounts associated with the distributed forecast device. The distributed forecast device receives energy usage data from one or more energy meters for each of the accounts. The distributed forecast device predicts an energy usage forecast for each of the accounts based on the energy usage data and the information from the central server.

20 Claims, 2 Drawing Sheets

(56) References Cited

U.S. PATENT DOCUMENTS

| | | | |
|---|---|---|---|
| 2011/0282510 A1* | 11/2011 | Son | G06Q 30/0283 |
| | | | 700/295 |
| 2012/0326883 A1 | 12/2012 | Agnelis et al. | |
| 2013/0096726 A1* | 4/2013 | Lyren | H02J 3/14 |
| | | | 700/291 |
| 2013/0166081 A1 | 6/2013 | Sanders et al. | |
| 2014/0025648 A1 | 1/2014 | Corbett et al. | |
| 2014/0207299 A1 | 7/2014 | Reichmuth et al. | |
| 2015/0357816 A1* | 12/2015 | Choe | H02J 3/00 |
| | | | 307/31 |

OTHER PUBLICATIONS

Swan, LG et al. "Modeling of End-Use Consumption in the Residential Sector, A Review of Modeling Techniques", Renewable and Sustainable Energy Reviews, vol. 1-3 Issue 8, Oct. 2009, pp. 1819-1835.

International Search Report and Written Opinion PCT/US2016/48924, ISA/US, ABB Schweiz AG, dated Oct. 31, 2016, 10 pgs.

* cited by examiner

DISTRIBUTED UTILITY RESOURCE PLANNING AND FORECAST

BACKGROUND

The present application generally relates to utility resource management, and in particular relates to distributed utility management and forecasting.

Typically, energy profiling and forecasting have been performed using a centralized architecture based at the utility headquarters. Energy resource usage measurements are collected from a variety of sources including monthly (non-interval) readings performed by service personnel, and increasingly automatic readings over the utility network connections are being performed. These inputs and estimates for the coming conditions (e.g., weather) are used to predict the energy usage in the future. Automatic (interval) readings are typically available more frequently (e.g., more than one reading per day) which typically results in an increase in the volume of data. Therefore, a need exists for further technological developments in the area of utility resource management.

SUMMARY

One embodiment is a unique system, components, and methods for distributed utility management. Other embodiments include apparatuses, systems, devices, hardware, methods, and combinations for distributed utility management. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE FIGURES

The description herein makes reference to the accompanying figures wherein like reference numerals refer to like parts throughout the several views, and wherein.

DESCRIPTION OF ILLUSTRATIVE EMBODIMENTS

Figure 1:
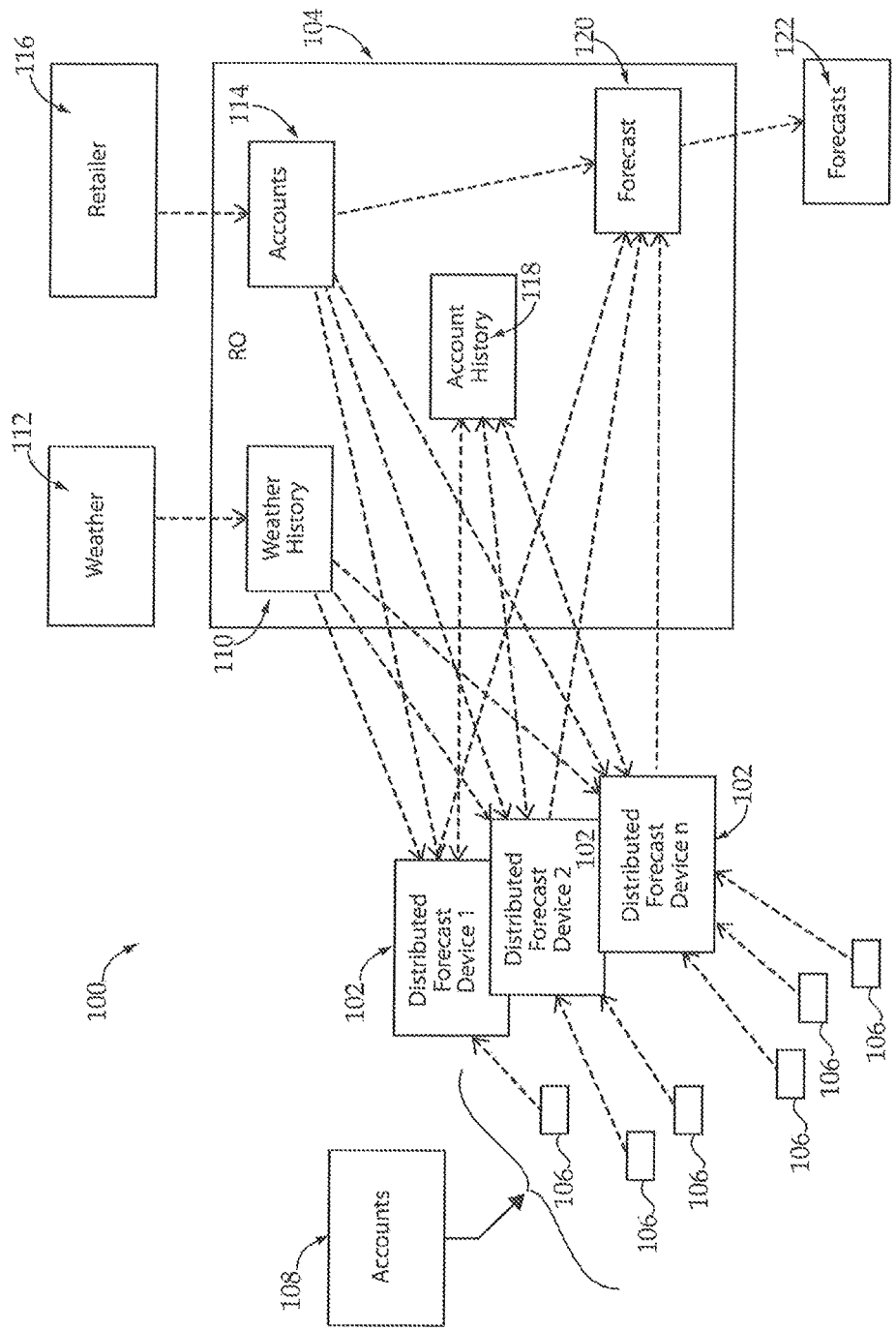
FIG. 1 is a schematic view of an example distributed system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 illustrates a schematic view of a distributed utility resource forecasting system 100. The system 100 includes distributed forecast devices 102 that are located in the utility communications network remote from a central server 104. A distributed energy forecast device 102 is a hardware and software component that may collect and temporarily store and forward interval meter data from one or more interval meters 106 for one or more accounts 108. In addition, the distributed forecast devices 102 receive account, weather, loss factor, and/or other information from the central server 104 that is specific to where the distributed forecast device 102 is located and to which accounts 108 the distributed forecast devices 102 are connected. Weather information may come from local sensors, at least for validation. In many embodiments weather information will come from central server 104. The distributed forecast devices 102 use these inputs to predict the energy usage from these accounts in the near future (e.g., hourly, 6 hours, 12 hours, 1 day, 1 week, 14 days, etc.). With expected improvements in the accuracy of long-range weather forecasts in the future, the predicted energy usage could be for still greater periods of time. The distributed forecast devices 102 process, review, and manage the energy usage forecasts locally. The distributed forecast devices 102 also send the energy usage forecasts to the central server 104 for planning and management purposes. In some instances the energy usage forecasts can be aggregated for planning and management.

The distributed forecast devices 102 may be installed and powered up at a remote location, e.g., a substation feeder (not shown), with network connections to a set of interval meters 106 and the central server 104. The distributed forecast device 102 may be configured with the network address of the central server 104 or may receive the network address during initial configuration.

The distributed forecast devices 102 may be configured to provide appropriate signal conditioning to transmit and receive desired information (data), and correspondingly may include filters, amplifiers, limiters, modulators, demodulators, CODECs, digital signal processing, and/or different circuitry or functional components as would occur to those skilled in the art to perform the desired communications.

It is contemplated that the central server 104 may include more than one server. The distributed forecast devices 102 may communicate via a wired connection or wirelessly with the central server 104. The distributed forecast devices 102 may communicate with the central server 104 over the public Internet. In addition, the network connections between the distributed forecast devices 102 and the central server 104 may be secure connections (i.e., encrypted). It is contemplated that the security and integrity of the distributed forecast devices 102 may be protected by not allowing any inbound network traffic to be received by the distributed forecast devices 102 (e.g., the only received messages are replies to outbound transactions).

The accounts 108 may be a building (e.g., a home, apartment complex, office building, etc.) or any other type of structure or device that consumes energy. The meters 106 in FIG. 1 are interval meters; however, it is contemplated that other types of meters may be used in other embodiments. The interval meters 106 monitor energy usage at their respective accounts and generate interval meter data that is sent to the corresponding distributed forecast device 102.

The distributed forecast device 102 may be configured with the account IDs assigned for its location or the distributed forecast device 102 may download the account IDs from the central server 104. Once the distributed forecast device 102 establishes a secure communication channel with the central server 104, the distributed forecast device 102 downloads a complete configuration for the assigned accounts, including account energy usage history, historical weather, weather forecasts, loss factors, etc. The configuration is stored in non-volatile memory of the distributed forecast device 102. Periodically the distributed forecast device 102 will request updates to this information as it is available, including short-term weather forecasts for the location. It is contemplated that the distributed forecast devices 102 may request the updates hourly, every 6 hours, every 12 hours, once a day, etc.

The central server 104 may include a weather database 110 that is populated with historical weather and weather forecasts from a weather forecasting entity 112. The relevant weather information from the weather database 110 may be sent to the appropriate distributed forecast devices 102.

The central server 104 may include an accounts database 114 that includes account information from one or more energy retailers 116 for the accounts 108. The account information may be sent to the distributed forecast devices 102 for processing.

The central server 104 may receive account energy usage information (e.g., interval meter data) from the distributed forecast devices 102 and store the account energy usage information in an account history database 118.

The central server 104 may include a forecast database 120 that receives and stores the energy usage forecasts from the distributed forecast devices 102. The central server 104 may transmit or generate reports that include energy usage forecasts 122 from the forecast database 120.

Each of the distributed forecast devices 102 begins a cycle that maintains energy usage forecasts for each of its respective accounts 108. The distributed forecast devices 102 maintain rolling, short-term databases for these energy usage forecasts or predictions, discarding older ones as they are no longer needed locally and have been forwarded to the central server 104 for storage and analysis. Each time a new interval meter reading or demand response control is received, the distributed forecast device 102 schedules the forecast for that account to be recalculated. When the distributed forecast devices 102 receive a new weather forecast from the central server 104, all assigned accounts are scheduled to be recalculated.

Each of the distributed forecast devices 102 may send blocking calls to the central server 104 asking if there are any actions that need to be taken or serviced. The central server 104 returns the blocked call with a request (e.g., a NOOP request) for the distributed forecast device 102 to perform a particular action. The distributed forecast device 102 schedules a time for the request to be processed and serviced (e.g., forward an account energy usage forecast). One purpose of this blocking call is that the central server 104 regularly responds with a NOOP request to implement an effective keep-alive function.

If for some unknown reason the distributed forecast device 102 becomes unavailable on the network, and the blocking call fails to be re-established, the central server 104 creates a management alert that the distributed forecast device 102 is down and not supplying updated forecasts. This triggers a service request to inspect and reset the distributed forecast device 102. It is contemplated that the distributed forecast device 102 may de-commissioned and moved to a new location.

The distributed forecast device 102 may be deployed at a substation feeder, but other locations are contemplated. In addition, it is contemplated that a substation intelligent electronic device or a solid state transformer may be used as a distributed forecast device 102. It is also contemplated that the distributed forecast device 102 may be a digital device that implements control functions for electric power.

Figure 2:
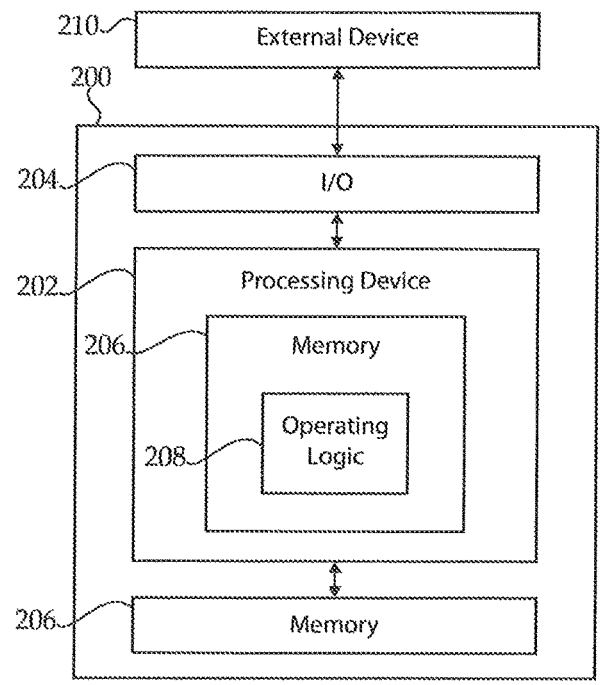
FIG. 2 is a schematic block diagram of an example distributed forecast device.

FIG. 2 is a schematic block diagram of one example of a distributed forecast device 200 such as the distributed forecast device 102 as shown in FIG. 1. The distributed forecast device 200 includes a processing device 202, an input/output device 204, memory 206, and operating logic 208. Furthermore, the distributed forecast device 200 communicates with one or more external devices 210.

The input/output device 204 allows the distributed forecast device 200 to communicate with the external device 210. For example, the input/output device 204 may be a transceiver, network adapter, network card, interface, or a port (e.g., a USB port, serial port, parallel port, an analog port, a digital port, VGA, DVI, HDMI, FireWire, CAT 5, or any other type of port or interface). The input/output device 204 may include hardware, software, and/or firmware. It is contemplated that the input/output device 204 will include more than one of these adapters, cards, or ports.

The external device 210 may be any type of device that allows data to be inputted or outputted from the distributed forecast device 200. For example, the external device 210 may be a switch, a router, a firewall, a server, a database, a mobile device, a networking device, a controller, a computer, a processing system, a printer, a display, an alarm, an illuminated indicator such as a status indicator, a keyboard, a mouse, or a touch screen display. Furthermore, it is contemplated that the external device 210 may be integrated into the distributed forecast device 200. It is further contemplated that there may be more than one external device in communication with the distributed forecast device 200.

Processing device 202 can be a programmable type, a dedicated, hardwired state machine, or any combination of these. The processing device 202 may further include multiple processors, Arithmetic-Logic Units (ALUs), Central Processing Units (CPUs), Digital Signal Processors (DSPs), or the like. Processing devices 202 with multiple processing units may utilize distributed, pipelined, and/or parallel processing. Processing device 202 may be dedicated to performance of just the operations described herein or may be utilized in one or more additional applications. In the depicted form, processing device 202 is of a programmable variety that executes algorithms and processes data in accordance with operating logic 208 as defined by programming instructions (such as software or firmware) stored in memory 206. Alternatively or additionally, operating logic 208 for processing device 202 is at least partially defined by hardwired logic or other hardware. Processing device 202 may include one or more components of any type suitable to process the signals received from input/output device 204 or elsewhere, and to provide desired output signals. Such components may include digital circuitry, analog circuitry, or a combination of both.

Memory 206 may be of one or more types, such as a solid-state variety, electromagnetic variety, optical variety, or a combination of these forms. Furthermore, memory 206 can be volatile, nonvolatile, or a combination of these types, and some or all of memory 206 can be of a portable variety, such as a disk, tape, memory stick, cartridge, or the like. In addition, memory 206 can store data that is manipulated by the operating logic 208 of processing device 202, such as data representative of signals received from and/or sent to input/output device 204 in addition to or in lieu of storing programming instructions defining operating logic 208, just to name one example. As shown in FIG. 2, memory 206 may be included with processing device 202 and/or coupled to the processing device 202.

Figure 3:
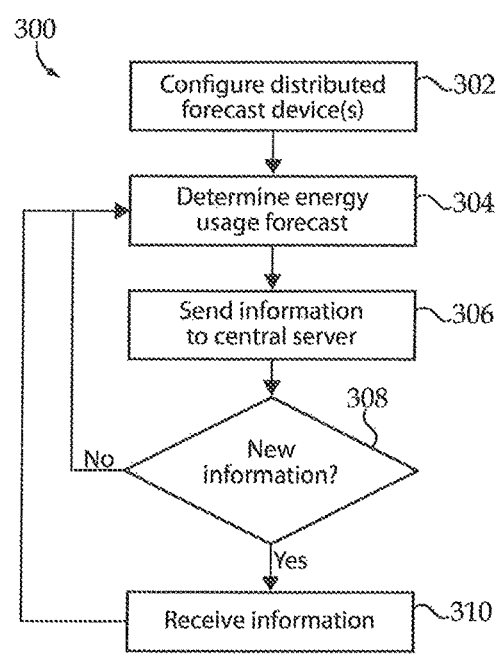
FIG. 3 is a flow diagram of an example procedure for managing and forecasting energy usage.

FIG. 3 illustrates a schematic flow diagram of an exemplary process 300 for managing and forecasting energy usage with the distributed forecast device 102. Operations illustrated for all of the processes in the present application are understood to be examples only, and operations may be combined or divided, and added or removed, as well as re-ordered in whole or in part, unless explicitly stated to the contrary.

Process 300 begins at operation 302 in which the distributed forecast devices 102 are powered on and configured by downloading account, weather, loss factor information, and/or other information from the central server 104 and receives interval meter data from the interval meters 106. Process 300 then proceeds from operation 302 to operation 304 in which the distributed forecast devices 102 determine the energy usage forecasts for their respective accounts 108 based on the information received. Process 300 then proceeds from operation 304 to operation 306 in which the distributed forecast devices 102 transmit the energy usage forecasts and/or the interval meter data to the central server 104.

Process 300 then proceeds from operation 306 to operation 308 in which the distributed forecast devices 102 determine whether new information is available. For example, the distributed forecast devices 102 may send a blocking call to the central server 104, which may respond with a NOOP request. The distributed forecast devices 102 may receive new interval meter data, a new weather forecast, or a demand response control. If no new information is available, process 300 proceeds from operation 308 to operation 304 where the distributed forecast device continues to determine energy usage forecasts according to its schedule. If a distributed forecast device 102 receives any of this new information, process 300 proceeds from operation 308 to operation 310 in which the new information is received by the distributed forecast device 102 and scheduled to be used in determining the new energy usage forecasts or the distributed forecast device 102 performs the requested action such as sending interval meter data to the central server 104. Process 300 then proceeds from operation 310 to operation 304 where the distributed forecast devices 102 determine energy usage forecasts.

The distributed forecast devices 102 may allow energy usage forecasts to be generated for each of the hour of a day based on the interval meter data and the information from the central server 104. For accounts that allow demand response control, the system 100 including the central server 104 may be able to shift energy usage to time periods when the cost is lower based on the energy usage forecasts. Rather than the central server 104 performing all of the processing, the distributed forecast devices 102 are capable handling the increased data rates and volumes, and can process the historical data and measurements into accurate and timely forecasts.

It is contemplated that multiple distributed forecast devices 104 may be used to handle any scale of deployment as opposed to the limited processing capacity in the central utility headquarters. Furthermore, the distributed forecast devices 102 provide to utilities visibility and traceability of energy resource usage to individual accounts by the measurements and results generated by the distributed forecast devices 102 as opposed to time aggregated readings in a centralized approach.

It is contemplated that the various aspects, features, computing devices, processes, and operations from the various embodiments may be used in any of the other embodiments unless expressly stated to the contrary.

The various aspects of the processes in the present application may be implemented in operating logic 208 as operations by software, hardware, artificial intelligence, fuzzy logic, or any combination thereof, or at least partially performed by a user or operator. In certain embodiments, operations represent software elements as a computer program encoded on a computer readable medium, wherein the distributed forecast device performs the described operations when executing the computer program.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system for forecasting and managing energy usage comprising:

A central server to store weather forecasts, historical weather information, historical energy usage, and by factor information in one or more databases;

A plurality of distributed forecast devices each in communication with the central server via a first network connection and an associated set of two or more of a plurality of interval meters, each one of the plurality of the interval meters is associated with a different account, via a second network connection, wherein each of the plurality of distributed forecast devices is located remote from the central server and located remote from the set of two or more of the plurality of interval meters, wherein each of the plurality of distributed forecast devices is configured to;

receive, from the central server, weather forecasts, historical weather information, historical energy usage, and loss factor information specific to an account of the associated interval meter;

receiving interval meter data from the set of two or more remote interval meters, wherein the interval meter data from each one of said remote interval meters includes an amount of energy used by the associated accounts;

determine an energy usage forecast for one or more energy resources associated with the account over a predetermined amount of time into the future based on the associated interval meter data, the weather forecasts, historical weather information, historical energy usage, and loss factor information;

transmit the energy usage forecast to the central server via the first network connection; and wherein the central server is configured to manage the energy resources based on the energy usage forecasts.

2. The system of claim 1, wherein the central server is further configured to receive the energy usage forecast and store the energy usage forecast.

3. The system of claim 1, wherein each of the distributed forecast devices is located at a substation feeder.

4. The system of claim 1, wherein the predetermined amount of time is 14 days or greater.

5. The system of claim 1, wherein each of the plurality of distributed forecast devices is further configured to temporarily store the interval meter data and transmit the interval meter data to the central server.

6. The system of claim 1, wherein each of the plurality of distributed forecast devices recalculates the energy usage forecast for the account when a new weather forecast is received.

7. The system of claim 1, wherein each of the plurality of distributed forecast devices recalculates the energy usage forecast for the account each time new interval meter data is received.

8. The system of claim 1, wherein each of the plurality of distributed forecast devices is further configured to periodically request updated information from the central server.

9. The system of claim 8, wherein the updated information includes short-term weather forecasts where the account is located.

10. The system of claim 1, wherein each of the plurality of distributed forecast devices recalculates the energy usage forecast for the account each time an account configuration change is received.

11. A method for managing and forecasting energy usage, comprising the steps of:
 establishing a first network connection for each of a plurality of distributed forecast devices with a remote central server;
 establishing a second network connection for each of the plurality of distributed forecast devices with a set of two or more remote interval meters, each one of said remote interval meters is associated with a different account, wherein the account includes one or more energy resources associated therewith;
 receiving at each of the plurality of distributed forecast devices from the remote central server, weather forecasts, historical weather information, historical energy usage, and loss factor information related to the account;
 receiving interval meter data at each of the plurality of distributed forecast devices from the set of two or more remote interval meters, wherein the interval meter data from each one of said remote interval meters includes an amount of energy used by the associated account;
 predicting an energy usage forecast for each of the particular accounts with the associated distributed forecast device based on the interval meter data, weather forecasts, historical weather information, historical energy usage, and loss factor information;
 transmitting the energy usage forecast from each of the distributed forecast devices to the remote central server via the first network connection; and
 managing the energy resources with the central server based on the energy usage forecasts.

12. The method of claim 11, further comprising:
 recalculating the energy usage forecast for the account when a new weather forecast is received from the remote central server.

13. The method of claim 11 further comprising:
 sending a blocking call to the remote central server.

14. The method of claim 13, further comprising:
 receiving a NOOP request in response to the blocking call from the remote central server; and
 recalculating the energy usage forecast for the account subsequent to the receiving of the NOOP request.

15. The method of claim 11, further comprising:
 recalculating the energy usage forecast for the account each time new interval meter data is received from the set of two or more remote interval meters.

16. A method for managing and forecasting energy usage, comprising the steps of:
 establishing a secure network connection for a plurality of distributed forecast devices with a remote central server;
 establishing a second network connection for each of the plurality of distributed forecast devices with a set of two or more remote interval meters, each one of said remote interval meters is associated with a different account, for each of a plurality of accounts, wherein each of the plurality of accounts is associated with a respective one of the plurality of distributed forecast devices and each of the plurality of accounts includes one or more energy resources associated therewith;
 receiving with each of the plurality of distributed forecast devices, from the remote central server, weather forecasts, historical weather information, historical energy usage, and loss factor information related to each of the accounts;
 receiving interval meter data at each of the plurality of distributed forecast devices from the set of two or more remote interval meters, wherein the interval meter data from each one of said remote interval meters includes an amount of energy used by each of the accounts;
 predicting energy usage forecasts for each of the accounts with the respective distributed forecast device based on the interval meter data, weather forecasts, historical weather information, historical energy usage, and loss factor information for each of the accounts;
 transmitting the energy usage forecasts from the distributed forecast devices to the remote central server via the secure network connection; and
 managing the energy resources with the central server based on the energy usage forecasts.

17. The method of claim 16, wherein each of the plurality of the distributed forecast devices is located at a substation feeder.

18. The method of claim 16, further comprising:
 recalculating the energy usage forecasts for the accounts when a new weather forecast is received from the remote central server.

19. The method of claim 16, further comprising:
 receiving new interval meter data from at least one of the set of two or more remote interval meters, wherein the new interval meter data is associated with a subset of the accounts; and
 recalculating the energy usage forecasts for he subset of accounts based on the new interval meter data.

20. The method of claim 16, when each of the energy usage forecasts is an amount of energy a respective account is predicted to use over a period of time that includes the next day or longer.

* * * * *